(12) United States Patent
Nitsch et al.

(10) Patent No.: US 6,561,779 B2
(45) Date of Patent: May 13, 2003

(54) TIRE VULCANIZATION MOULD WITH BLOCKING MEMBERS MOUNTED IN VENTING BORES

(75) Inventors: Boris Nitsch, Alzenau (DE); Tayfun Serener-Thielmann, Wiesbaden (DE)

(73) Assignee: Dunlop GmbH, Hanau (DE)

( * ) Notice: Subject to any disclaimer, the term of this patent is extended or adjusted under 35 U.S.C. 154(b) by 0 days.

(21) Appl. No.: 09/769,786

(22) Filed: Jan. 25, 2001

(65) Prior Publication Data

US 2002/0051829 A1 May 2, 2002

Related U.S. Application Data

(63) Continuation of application No. PCT/EP99/05323, filed on Jul. 26, 1999.

(30) Foreign Application Priority Data

Jul. 27, 1998 (DE) .......................................... 198 33 730
Jan. 11, 1999 (DE) .......................................... 199 00 596

(51) Int. Cl.⁷ .............................................. B29C 33/10
(52) U.S. Cl. ....................... 425/28.1; 249/141; 425/812
(58) Field of Search ............... 425/28.1, 812; 249/141

(56) References Cited

U.S. PATENT DOCUMENTS

| | | | |
|---|---|---|---|
| 2,865,052 A | * 12/1958 | Wilcox ........................ 425/812 |
| 3,377,662 A | 4/1968 | Fukishima | |
| 4,347,212 A | 8/1982 | Carter ......................... 264/315 |
| 4,759,701 A | 7/1988 | Carter ......................... 425/28.1 |
| 4,795,331 A | 1/1989 | Cain et al. ................... 425/28.1 |
| 5,922,237 A | * 7/1999 | Green ......................... 425/28.1 |
| 5,939,101 A | * 8/1999 | Green ......................... 425/28.1 |

FOREIGN PATENT DOCUMENTS

| DE | 1 604 425 | 4/1965 |
|---|---|---|
| DE | 2 248 282 | 10/1992 |
| DE | 195 43 276 C1 | 11/1995 |

OTHER PUBLICATIONS

German Search Report No. 198 33 730.2 dated Sep. 9, 1999.
PCT Search Report No. PCT/EP 99/05323 dated Feb. 3, 2000.

* cited by examiner

Primary Examiner—James P. Mackey
(74) Attorney, Agent, or Firm—Fitch, Even, Tabin & Flannery

(57) ABSTRACT

The invention relates to a vulcanization mold for producing rubber goods, especially vehicle tires. The mold has a number of deairing holes into which blocking mechanisms are introduced. The blocking mechanisms ensure, especially by means of the air duct being bent, that the air can be drained without any disadvantageous flash being produced. In a second embodiment, the blocking mechanisms forms a two-part valve with the central body. In this case, the blocking mechanism has an elastically deformable planar area placed on the inside of the mold which acts at least essentially as a seal in conjunction with the central body when impinged upon by the surface of the blank.

27 Claims, 8 Drawing Sheets

TIRE VULCANIZATION MOULD WITH BLOCKING MEMBERS MOUNTED IN VENTING BORES

This is a continuation, of prior application number PCT/EP99/05323, filed Jul. 26, 1999 and designating the U.S. which is hereby incorporated herein by reference in its entirety.

The invention relates to a vulcanisation mould for the manufacture of technical rubber products, in particular for the manufacture of vehicle tires, comprising a plurality of venting bores in each of which there is provided a blocking member, which at least substantially blocks the penetration of blank material.

Vulcanisation moulds of this kind are, for example, known from U.S. Pat. No. 4,347,212 or from the German patent specification 195 43 276 C1.

The purpose of the venting bores, of which several thousands can be provided in one vulcanisation mould, is to ensure a problem-free venting of all regions of the vulcanisation mould provided with tread pattern forming webs in order to ensure that the tire blank can accurately contact the form-giving tools or webs of the vulcanisation mould from the inside during the inflation process and that such accurate contact against the mould is not hindered by air inclusions.

An undesired disadvantage of the existing vent bores lies in the fact that rubber enters into these bores, which normally have a diameter of 0.7 to 1.5 mm, and the so-formed shoots give the finished tire a brush-like or hedgehog-like appearance. Various techniques are admittedly known to remove these undesired shoots; however, all these techniques cause extra work and considerable costs.

In order to avoid the undesired shoots it is known to insert valves into the venting bores which are closed by the approaching surface of the blank and which open again during demoulding. The disadvantage of valves of this kind which have hitherto been used in tire vulcanisation moulds lies above all in the fact that they are complicated as a result of their multi-part construction and that a coil spring is required to ensure a defined closing and opening process, with the coil spring always having, as far as possible, the same characteristic for the large number of valves that are required. The extremely small dimensions of these valves make it more difficult to ensure practically identical characteristics.

The object of the invention is to provide a ventable vulcanisation mould with blocking members which are particularly simple and thus economically designed, which can be installed and removed without problem and rapidly and which ensure a high operational reliability.

This object is satisfied in accordance with the invention essentially in that each blocking member includes a central body, in particular a pin-like central body, which can be fixed in the respective vent bore in force-locked manner, and also a sealing part connected to the central body, with the sealing part having a surface region at the inner side of the mould and substantially flush with it, which is provided with at least one aperture and forms, together with the mould-side end face of the central body at least one flowpath for the air, which is pronouncedly angled following the aperture.

Through the special design of the blocking member, which can be of one-piece or two-piece construction, it is possible to stop the blank material which meets the blocking members without any movable elements and simply as a result of the guidance of the air flow and to prevent any form of disturbing penetration of blank material into the air discharge passages that are formed, which would lead to shoots at the finished product, which in turn has the consequence that on opening the mould no rubber material remains in the specially formed air discharge passages and could block the latter.

The absence of any movable elements, such as are present when using valves in the form of movable valve stems, leads to a high operational reliability and, above all, to the fact that no damage arises during cleaning of the moulds, which is frequently effected by blasting them with ice crystals, which could make the blocking members unsuitable for use. A further advantageous consequence of the design of the blocking members in accordance with the invention is the fact that the mould cleaning cycles can be substantially extended because of the largely avoided danger of blocking members becoming ineffective through contamination.

When the blocking member of the invention is of two-part construction, a resilient latching of the sealing part to the central body preferably takes place. For this purpose, parts of the clamping limbs which are intended for the fixation of the central body in the mould bores and which are connected to the disc-like blocking surface are cranked inwardly in the form of coupling lugs and engage behind support projections on the central body so that a snap-in latch connection is provided.

The blocking members formed in accordance with the invention can be simply and rapidly positioned accurately in bores of the respective mould, since for this it is only necessary to press the blocking members into the bores and the end position is achieved when the edge of the disc-like blocking surface comes into contact with the wall of the mould.

The blocking member of the invention accordingly operates in the manner of a nozzle with a specially shaped air guidance which prevents the formation of mould shoots, for which purpose, on the one hand, the minimal dimensions of the existing air guidance channels and, on the other hand, the angled shape of these air guidance channels is characteristic.

In accordance with a second embodiment variant, the blocking member is movable at least in the sense that it has an elastically deformable surface region at the inside of the mould. This surface cooperates in an at least substantially sealing manner with the central body on being loaded by the surface of the blank. The blocking member thus forms a two-part valve with the central body in accordance with this embodiment.

In other words, the object is satisfied in accordance with the invention in a second basic way by a vulcanisation mould for the manufacture of vehicle tires having a plurality of venting bores, in each of which a valve is mounted and designed in such a way that it is at least substantially closed by the approaching surface of the blank and is opened again on demoulding, with the special characteristic that each valve is of two-part design and includes a central body, in particular a pin-like central body, which can be fixed in the respective venting bore, and also a sealing part which is releasably connected to the central body and which has at least one elastically deformable surface region disposed at the inner side of the mould, which cooperates in an at least substantially sealing manner with the central body on being loaded by the surface of the blank.

Figure 1:
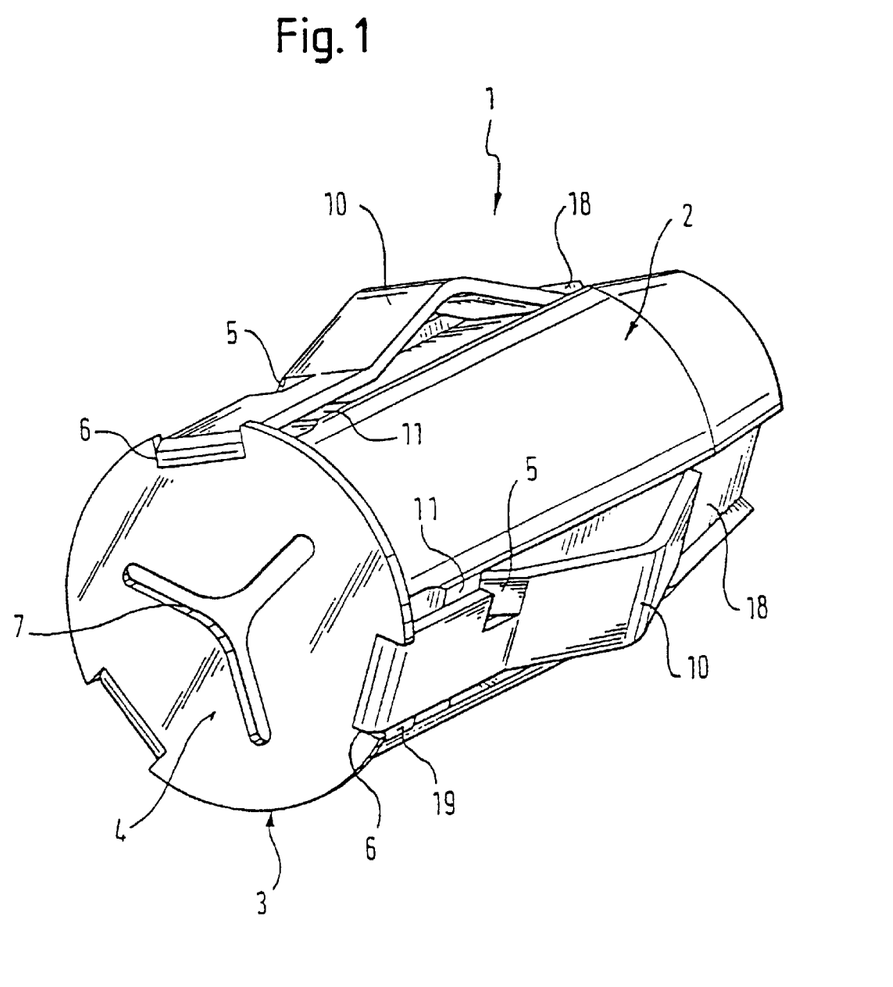
FIG. 1 a perspective representation of a first embodiment of a blocking member in accordance with the invention.
Figure 2:
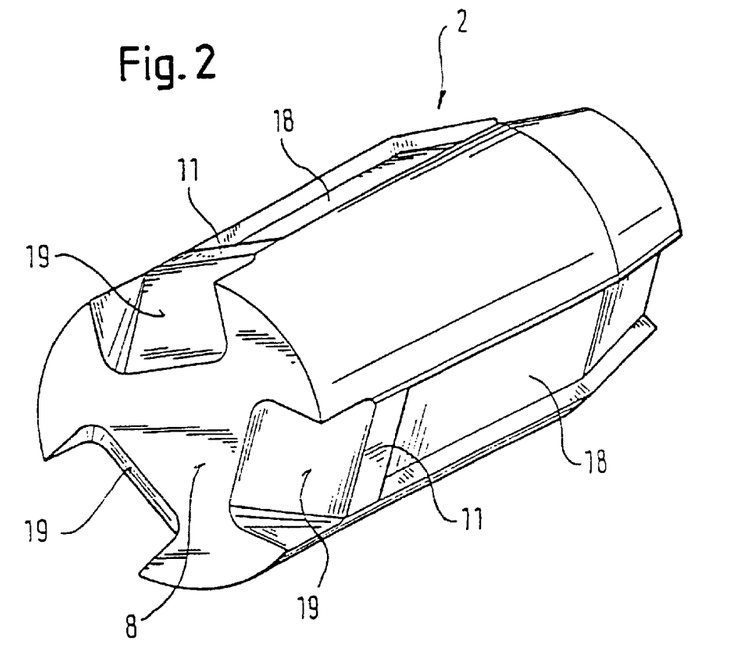
FIG. 2 a perspective representation of the central body of the blocking member of FIG. 1.
Figure 3:
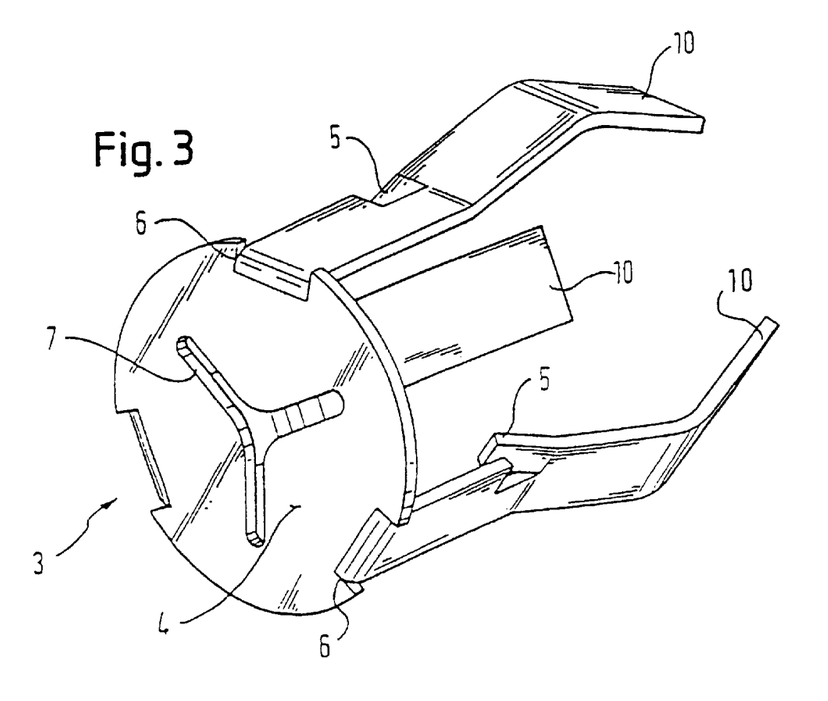
FIG. 3 a perspective representation of the sealing part of the blocking member of FIG. 1.

Even though a movement of the surface region of the blocking member disposed at the inner side of the mould occurs in the sense of an elastic deformation thereof in this embodiment variant in order to achieve a complete sealing and therefore a valve function, the degree of movement is relatively small and cannot be compared with the previously known embodiments with valve tappets. With this second embodiment variant, practically all advantages of the first embodiment variant can thus be achieved, with, however, the said first embodiment variant in accordance with FIGS. 1 to 3 representing the best embodiment in the opinion of the applicant.

Not only is a substantial simplification of the construction of the valve achieved through the integration of the spring function into one of the two components of the valve and through the avoidance of the need to use an individual coil spring, which is achieved hereby, but rather the operational reliability is increased and the handling made easier.

The central body is of substantially cylindrical shape and has a diameter of approximately 1 mm to 10 mm, and the diameter of the central body is approximately 0.01 mm to 2 mm smaller having a valve diameter in in comparison to the diameter of the venting bore. It can be fixed by clamping elements which are provided on the central body or on the sealing part in the respective venting bore, while forming air passages. Depending on the arrangement of the clamping elements on the central body or on the sealing part, two different embodiments of venting valves arise which are, however, equivalent with respect to their function. Since they each only consist of two parts, an adequately large air throughflow cross-section is present and closing and opening procedures take place in a predeterminable and reliable manner as a result of the defined spring force.

Valves formed in accordance with the invention the range from about 2 mm to 12 mm can be manufactured of the most diverse materials, in particular of sheet metal spring material, die-cast aluminium or zinc, ceramic, sintered metals and also of injection-moulded parts of appropriately suited metals or corresponding temperature-resistant plastics.

The invention will be explained in the following by way of an embodiment with reference to the drawings in which are shown.

In the perspective representation of FIG. 1, the blocking member which can be inserted into the vent bore of the vulcanisation mould is designated generally with the reference numeral 1 and its blocking member comprises, in accordance with this embodiment of the invention, a central body 2 and a sealing part 3 which can be latched to it.

In accordance with FIG. 2, the central body 2 which preferably comprises an injection-moulded part, is formed in the manner of a cylindrical pin and is provided with guide grooves 18 uniformly distributed around its periphery to receive clamping limbs 10 of the sealing part 3. Through the cooperation between the guide grooves 18 and the clamping limbs 10 a security against rotation for the sealing part 3 is also provided.

These guide grooves 18 are chamfered inwardly in the rear region of the central body 2 and support projections 11 are formed in the grooves 18 in the mould side end region of the central body 2 and serve for the latching of the sealing part 3. The guide grooves 18 are led radially inwardly towards the end face 8 disposed at the mould side so that inclined surfaces 19 arise.

FIG. 3 shows the sealing part 3 which preferably consists of thin spring steel having a thickness in the range from about 0.05 mm to 0.3 mm and is formed by a circular surface region 4 forming a blocking surface on which three clamping limbs 10, which are uniformly distributed over the circumference, are formed.

The blocking surface 4 is provided with a centrally disposed Y-shaped slot aperture 7. The angling of the clamping limbs 10 from the blocking surface 4 takes place via short radial cuts 6 so that the regions of the clamping limbs 10 at the blocking surface side are disposed radially somewhat within the outer periphery of the blocking surface 4. Through these cuts and angled portions of the clamping limbs 10, very narrow slots also arise, via which a certain air discharge can take place, with the slots which result being so narrow that no penetration of blank material occurs.

The clamping limbs 10 are provided with kinked locations so that limb parts project radially beyond the outer periphery of the circular sealing part 3 and the clamping limbs can thus take on the required fixation function in the state in which they are inserted into the bores.

A part region in the form of a coupling lug 5 is cranked inwardly from each clamping limb 10 and this coupling lug 5 serves for the snap-in latch connection to the central body 2.

FIG. 1 shows the assembled state of the central body 2 and the sealing part 3, with the clamping limbs 10 engaging into the guide grooves 18 and the coupling lugs 5 latchingly engaging behind the support projections. If the so formed blocking member is pressed into a mould bore, then the kinked regions of the clamping limbs 12 extend, whereby, on the one hand, the holding force for the blocking member in the respective bore is produced and, on the other hand, the blocking surface is stressed by the coupling lugs 5 against the end surface 8 of the central body 2.

If the blank material, i.e. the rubber material, reaches the blocking member 1 in the practical operation of a vulcanisation mould, which is provided with a large number of such blocking members, then the air, which is still present in the corresponding part regions of the mould, can escape via the aperture 7 or via the cuts or gaps 6 having very small dimensions while the rubber material can at most enter into the aperture 7, but can no longer penetrate into the minimal gap space between the blocking surface 4 and the end face 8. Since the thickness of the sealing part 3 only amounts to a fraction of a millimeter, hardly visible, minimal markings arise at most in practice due to penetration of the blank material into the aperture 7 and are in no way disturbing.

As a result of the small thickness of the blocking surface 4, no adhesive forces can form between the walls of the aperture 7 and the blank material which could bring about a tearing of rubber material on opening of the mould and thus a blocking of the apertures. This is an important reason why a problem-free long-term operation can be ensured with the blocking members of the invention.

The blocking members of the invention can be made practically fully automatically, with the sealing part 3 comprising a punched out and bent part and the central body 2 comprising a moulded or injection-moulded part. The joining together of the two parts can also be automated as a result of the simple snap-in latch connection.

The second variant of the embodiment of the invention is now described by way of the two embodiments in accordance with FIGS. 4 to 9.

Figure 4A:
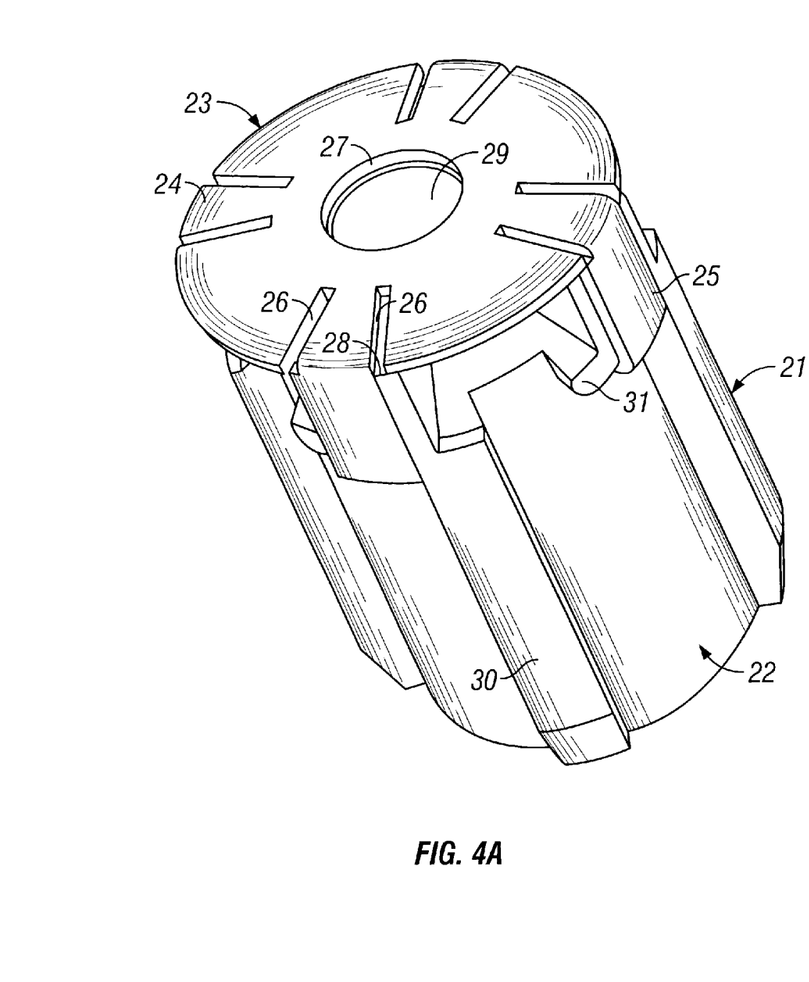
FIG. 4a and 4b show a perspective representation of a second embodiment of the invention in the form of a venting valve.
Figure 4B:
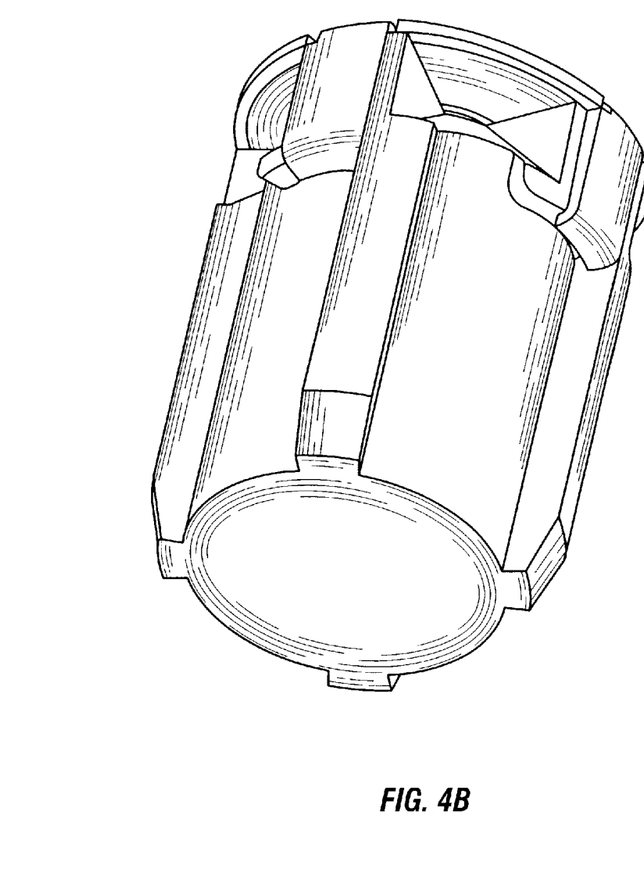

In the perspective representation of FIG. 4 the valve which can be inserted into a venting bore of a vulcanisation mould is designated with the general reference numeral 21 and this valve 21 comprises a central body 22 and a sealing part 23 which can be coupled to it.

The central body 22 is of substantially cylindrical shape and has a plurality of strip-like clamping elements 30 distributed around its circumference which, after the insertion of the valve into a venting bore, clampingly contact the internal wall of the bore and form air passages between them.

Supporting projections 31 are moulded on in the upper region of the central body, i.e. at the sealing side, which enable a coupling on of the sealing part 23.

The sealing part 23 is made in the form of a flexible sealing disc, the surface 24 of which is elastically deformable in the direction of the central body in operation by the approaching blank surface.

The outer circumference of the sealing disc 23 contacts corresponding support surfaces 28 of the central body and it is provided centrally with a circular cut-out 27 in the illustrated embodiment which forms the main air throughflow opening. A disc-like formation 29 is provided on the central body 22 lying opposite to this cut-out 27 and is of complementary shape. On deflection of the sealing surface 24 the formation 29 enters into the cut-out 27 and thereby practically closes the main air throughflow opening.

A plurality of coupling limbs 25 are connected to the sealing disc 24 distributed around the periphery but decoupled from it motionwise by pairs of slots 26. The coupling limbs can be coupled in the manner of a bayonet connection to the support projections 28 present at the central body 22.

This type of coupling between the central body 22 and the sealing part 23 only represents one possible type of coupling, it has, however, the advantage that a simple and rapid separation of the two parts is possible by means of a suitable tool. For example a magnetic screw driving tool can be used for this purpose.

Figure 5A:
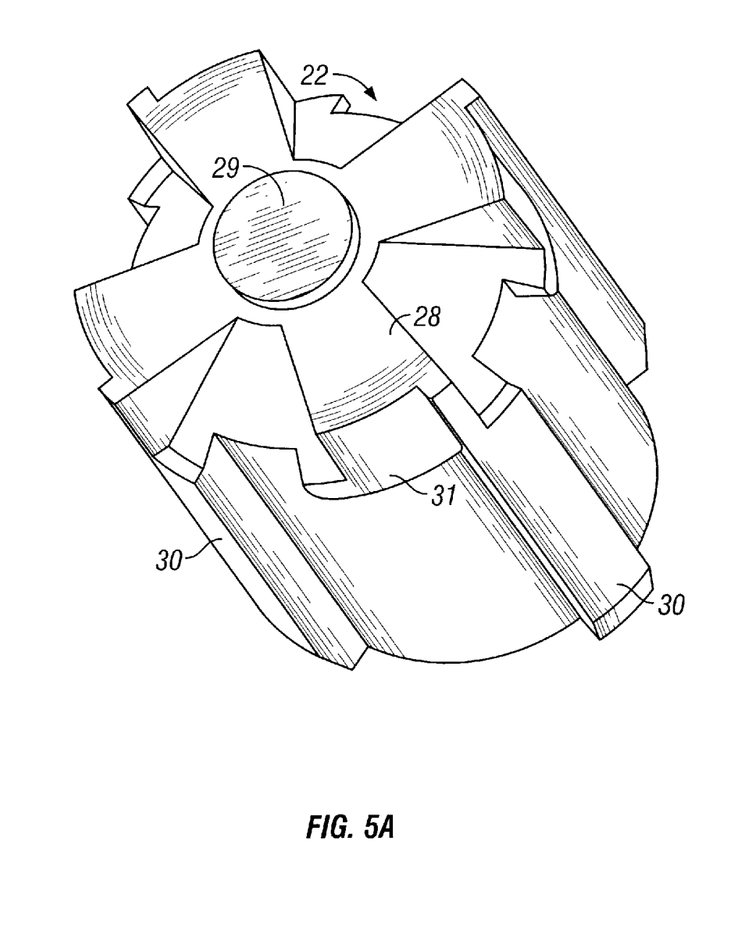
FIG. 5a and 5b show a perspective representation of the central body of the valve in the accordance with FIG. 4.
Figure 5B:
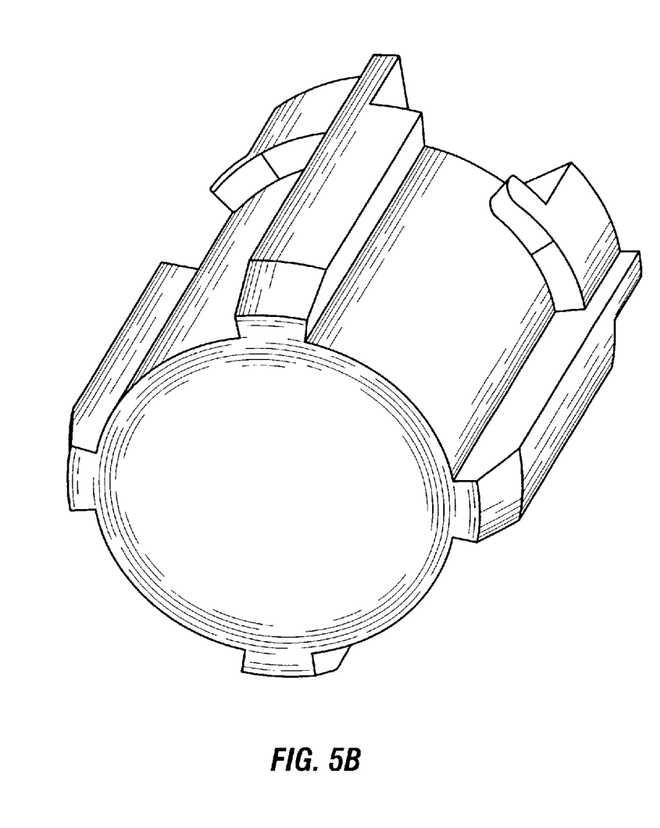

FIG. 5 shows the design of the central body 22 with the formation 29 provided centrally at the end face which cooperates with the cut-out 27 in the sealing part 23. The support surface 28 at the end face extends so that it drops away towards the formation 29 starting from its peripheral region, so that the elastic sealing surface 24 can execute the required closing and opening movements.

The radial height of the clamping elements 30 and also of the support projections 28 is so selected that the former can develop the required clamping action in the venting bores and the latter enable a coupling to the coupling limbs 25 which takes place by a rotary movement even with the central body 22 inserted into the venting bore.

Figure 6A:
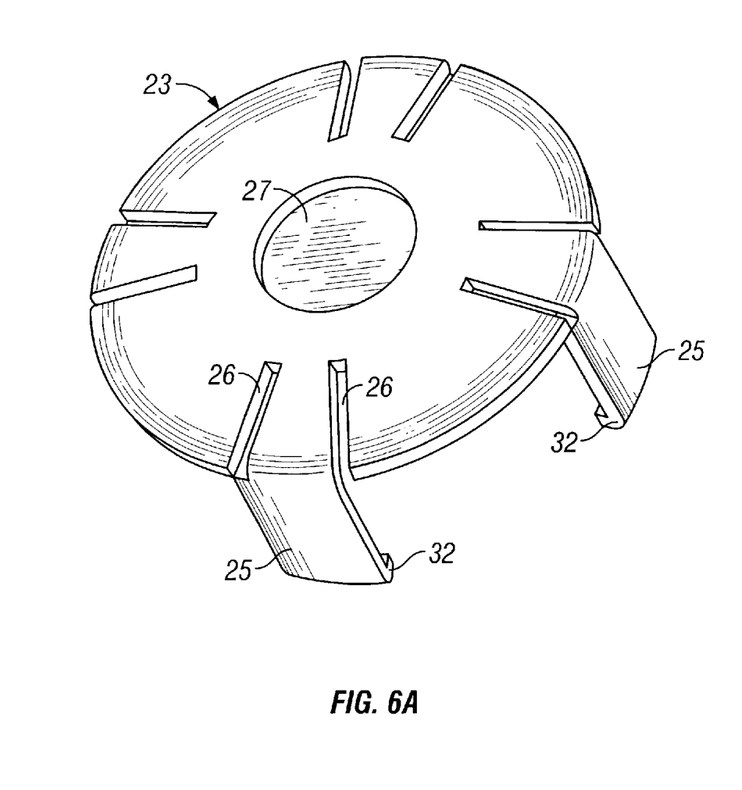
FIG. 6a and 6b show a perspective representation of the sealing part of a valve in accordance with FIG. 4 which can be coupled to the central body.
Figure 6B:
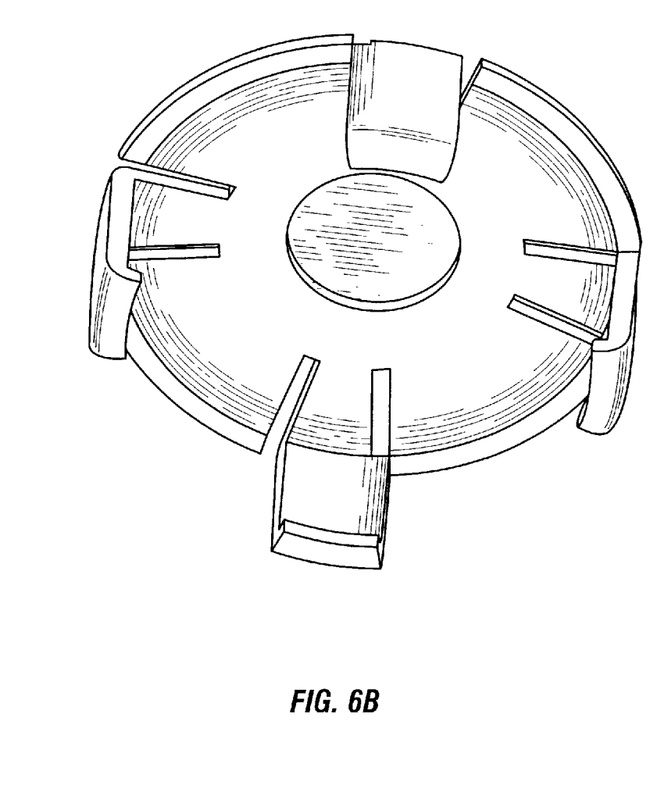

FIG. 6 shows once again in detail the design of the sealing part 23 or of the sealing disc with the central cut-out 27, the slot pairs 26 and the coupling limbs 25, which have angled portions 32 at their free ends which engage behind the support projections 31 at the central body 22 in the coupled state.

Figure 7:
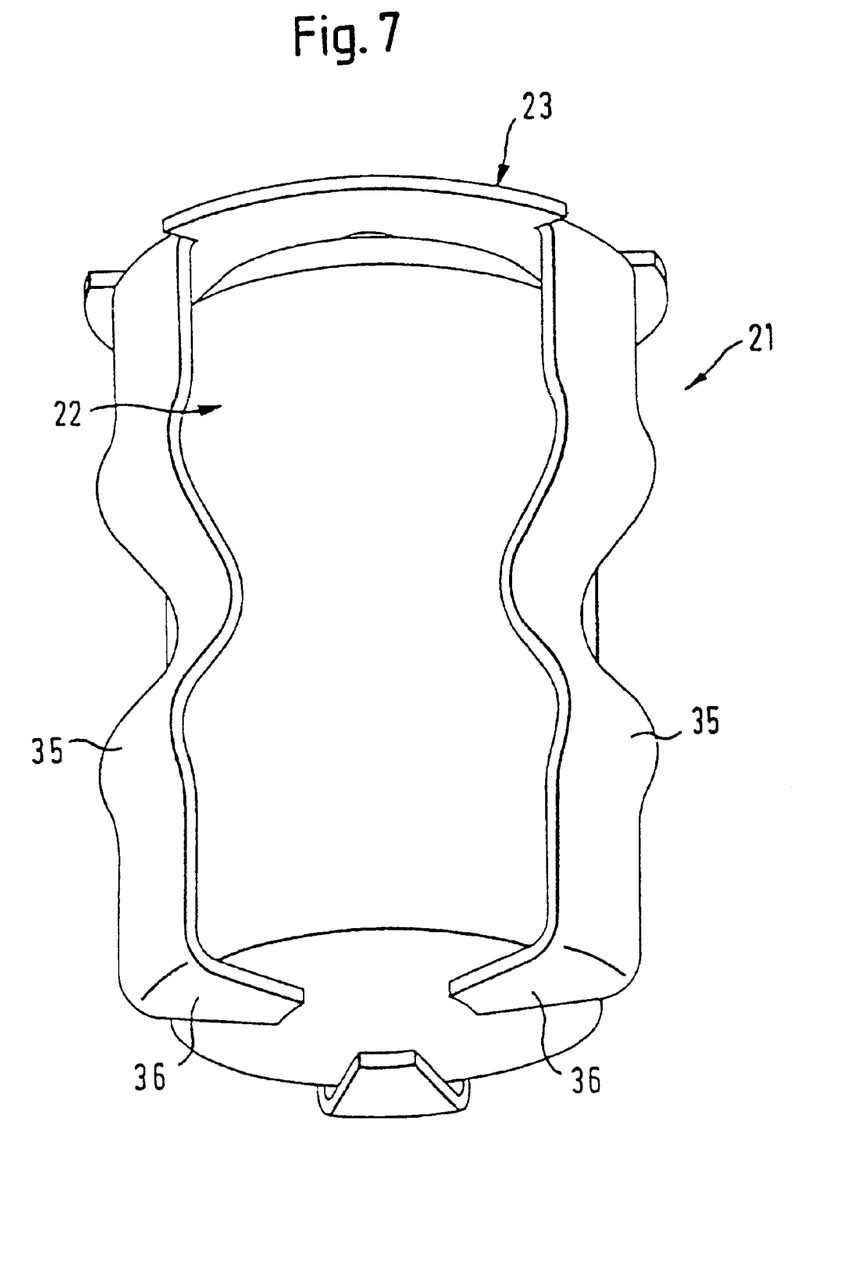
FIG. 7 a perspective representation of a further embodiment variant of a valve in accordance with the invention.

FIG. 7 shows a modified embodiment of the two-part valve 21, with this embodiment being characterised above all by a further design simplification.

The valve 21 in accordance with this embodiment again includes a central body 22, in this case formed as a cylindrical pin, and also a sealing part 23 which cooperates with the central body 22 and which is provided with a plurality of corrugated spring limbs 35, in particular three spring limbs which are formed in one piece and distributed around the periphery, with the spring limbs being inwardly angled at their free ends 36 and thus defining a receiving space for the holding of the central body 22.

In contrast to the embodiment of FIGS. 4 to 6, the pin-like central body 22 no longer need be pressed into the venting bore of the vulcanisation mould in this embodiment, but is rather simply held by the spring limbs 35 of corrugated design. These corrugations on the limbs 35 deform in the bore when being pressed in and press against the central body 22. In this manner this central body 22 is axially held in the desired position, with the deformation stress of the limbs ensuring that the elastic sealing disc 23 is held accurately positioned and can also not be pressed out of the central body, with the bent-over free ends 36 additionally preventing the pin-like central body 22 from sliding out of the receiving space formed by the corrugated springs 35. This type of holding is also of advantage because differences in growth in the bore and in the central body at elevated temperatures are automatically necessarily compensated for by the pressing stress produced via the corrugated springs 35.

The outer diameter of the sealing disc 23 is greater than the bore diameter, so that the outer peripheral edge of the sealing disc 23 contacts the edge of the bore and can deform elastically in the axial direction of the valve 21 starting from this contact surface. Moreover, the valve position is uniquely defined and the insertion is facilitated by this abutment of the sealing part 23 at the respective edge of the bore.

The shape of the sealing part 23 which forms a sealing surface can be flat, can, however, also be of spherical shape, and indeed up to a spherical angle of about 20°.

Figure 8:
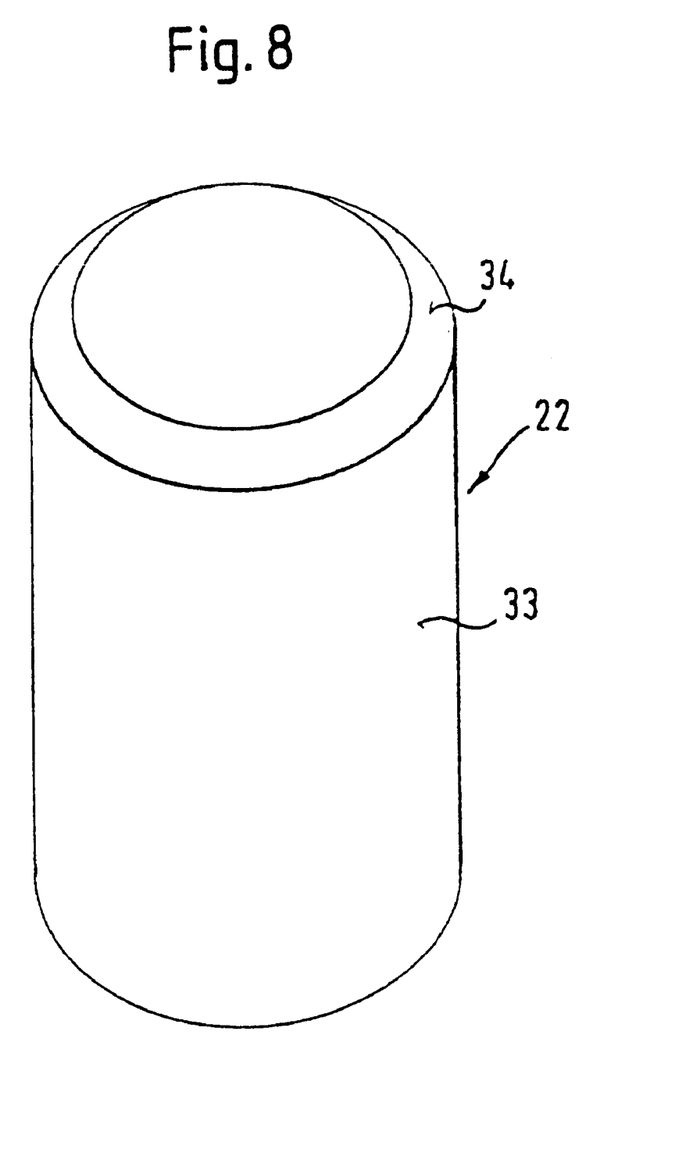
FIG. 8 a perspective representation of the central body of the valve in accordance with FIG. 7.

FIG. 8 shows the central body for the valve of FIG. 7. This central body 22 has a smooth-walled peripheral surface 33 and is provided at the end face which cooperates with the sealing part 23 with a chamfer 34 at its outer periphery.

Figure 9:
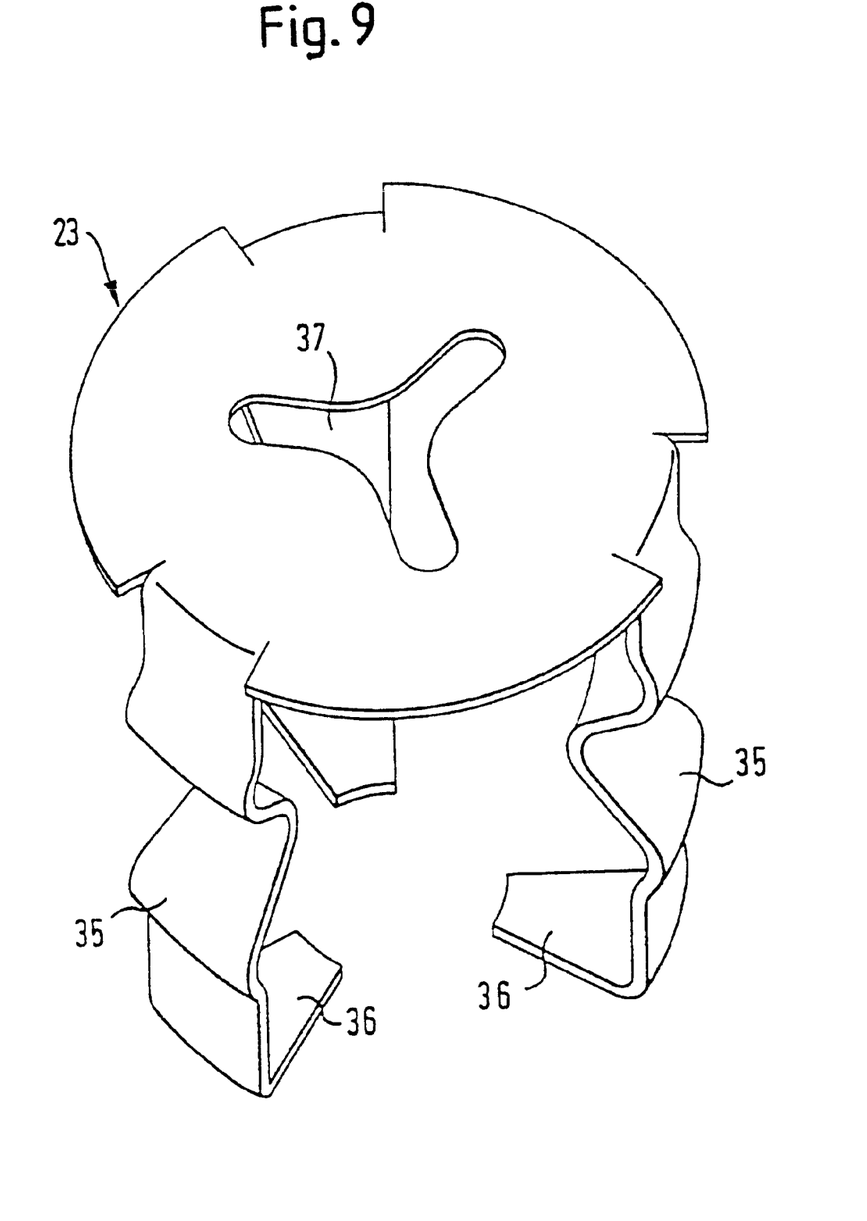
FIG. 9 a perspective representation of the sealing part of the valve in accordance with FIG. 7 which can be coupled to the central body.

FIG. 9 shows in a perspective view the cover or sealing part 23 of the valve of FIG. 7 and it can be seen that in this case a Y-shaped or generally star-shaped cut-out 37 is arranged approximately centrally as the main air throughflow opening. This design is not, however, essential; it does, however, ensure a problem-free operation in conjunction with the central body 22 of FIG. 8.

What is claimed is:

1. A vulcanisation mould for the manufacture of technical rubber products comprising a plurality of venting bores, in each of which there is provided a blocking member, which at least substantially blocks the penetration of a blank material, wherein each blocking member includes a central body fixed in the respective venting bore in a force-locked manner, and a sealing part connected to the central body, with the sealing part having a surface region at an inner side of the mould and substantially flush with the mould, which is provided with at least one aperture and forms, together with a mould side end face of the central body at least one air flow path.

2. The vulcanisation mould in accordance with claim 1, wherein the flow path is pronouncedly angled following the aperture.

3. The vulcanisation mould in accordance with claim 1, wherein the air flow path is angled by approximately 90°, following the aperture and continues between the bore wall and the central body.

4. The vulcanisation mould in accordance with claim 1, wherein the aperture is centrally arranged in the surface region forming a blocking surface, and is of a round bore and/or slot design.

5. The vulcanisation mould in accordance with claim 1, wherein the blocking member is of two-part design, and in that the sealing part is latchably connected to the central body.

6. The vulcanisation mould in accordance with claim 1, wherein the central body is of substantially cylindrical shape and has a smaller diameter in comparison to the diameter of the venting bore, and in that the central body can be fixed in the respective venting bore by clamping elements, which consist of spring limbs, and which are provided on the central body or on the sealing part while forming air passages.

7. The vulcanisation mould in accordance with claim 6, wherein the sealing part has a substantially disc-shaped or spherical blocking surface for blank material, having slot apertures and also includes a plurality of coupling lugs arranged distributed around the periphery for the latching to the central body.

8. The vulcanisation mould in accordance with claim 7, wherein the blocking surface has, a plurality of radial cuts at the edge, wherein a pair of radial cuts bound each spring limb, which is bent at right angles with respect to the blocking surface and engages in a guide channel in the central body.

9. The vulcanisation mould in accordance with claim 8, the coupling lugs are formed from inwardly cranked sections of the spring limbs and engage behind support projections at the central body.

10. The vulcanisation mould in accordance with claim 1, wherein the diameter of the central body lies between 1 mm and 10 mm, and is 0.01 mm to 2 mm smaller than the bore diameter.

11. The vulcanisation mould in accordance with claim 1, wherein the sealing part consists of a sheet metal spring with a thickness in the range from about 0.05 mm to 0.3 mm.

12. The vulcanisation mould in accordance with claim 1, wherein the central body consists of an injection-moulded part.

13. The vulcanisation mould in accordance with claim 1, wherein the blocking member forms a two-part valve; wherein the sealing part of the blocking member includes an elastically deformable surface region disposed at the innerside of the mould which cooperates in an at least substantially sealing manner with the central body on being loaded by a surface of the blank.

14. The vulcanisation mould in accordance with claim 13, wherein the central body is of substantially cylindrical shape and has a diameter which is smaller in comparison to the diameter of the venting bore; and wherein the central body is fixed by clamping elements, which are provided on the central body or on the sealing part, in the respective venting bore, while forming air passages.

15. The vulcanisation mould in accordance with claim 13 or 14, wherein the sealing part has a substantially disk-shaped or spherical sealing surface having cut-outs and/or recesses and a plurality of coupling limbs distributed around the periphery for the connection to the central body.

16. The vulcanisation mould in accordance with claim 15, wherein the disk-shaped or spherical sealing surface is supported on the central body and, on elastic deformation in the direction of the central body, comes into contact against the central body with at least substantial closure of the air flow path.

17. The vulcanisation mould in accordance with claim 16, wherein said aperture is formed in the central region of the elastic sealing surface.

18. The vulcanisation mould in accordance with claim 17, wherein upon elastic deformation of the sealing surface complementarily shaped formation of the central body engages into said aperture.

19. The vulcanisation mould in accordance with claim 18, wherein the elastic sealing surface has a plurality of radial cuts, wherein a pair of radial cuts bound a coupling limb which has a portion extending parallel to the peripheral surface of the central body and an angled free end adjoining it, with this coupling limb cooperating with support projections on the central body in the manner of a bayonet connection.

20. The vulcanisation mould in accordance with claim 14, wherein the clamping elements consist of strip formations, which extend at least substantially over the axial length of the central body.

21. The vulcanisation mould in accordance with claim 14, wherein the central body has a formation free peripheral surface and the clamping elements consist of corrugated spring limbs, which are formed in one piece with the sealing part and which are inwardly angled at their free ends to provide a receiving space for the central body.

22. The vulcanisation mould in accordance with claim 21, wherein the diameter of the sealing part is greater than the diameter of the venting bore.

23. The vulcanisation mould in accordance with claim 22, wherein the cylindrical central body has a chamfer at its outer periphery on a side facing the sealing part, and said aperture is star-shaped.

24. The vulcanisation mould in accordance with claim 23, wherein the valve diameter lies in the range from about 2 to 12 mm, and the diameter of the central body is between 0.01 to 2 mm smaller than the bore diameter.

25. The vulcanisation mould in accordance with claim 24, wherein the sealing part consists of a spring metal sheet, with a thickness in the range from 0.05 to 0.3 mm.

26. The vulcanisation mould in accordance with claim 25, wherein the sealing surface of the sealing part is substantially flat or spherically shaped.

27. The vulcanisation mould in accordance with claim 26, wherein with a spherical shape of the sealing surface, the angle of the spherical surface amounts to 20°.

* * * * *

UNITED STATES PATENT AND TRADEMARK OFFICE
CERTIFICATE OF CORRECTION

PATENT NO.    : 6,561,779 B2
DATED         : May 13, 2003
INVENTOR(S)   : Nitsch et al.

It is certified that error appears in the above-identified patent and that said Letters Patent is hereby corrected as shown below:

Column 7,
Line 48, after "valve;" insert -- and --.

Column 8,
Line 17, after "surface" insert -- a --.

Signed and Sealed this

Twenty-third Day of December, 2003

JAMES E. ROGAN
*Director of the United States Patent and Trademark Office*